US006933857B2

(12) United States Patent
Foote

(10) Patent No.: US 6,933,857 B2
(45) Date of Patent: Aug. 23, 2005

(54) METHOD AND SYSTEM FOR AIRBORNE METER COMMUNICATION

(76) Inventor: Charles A. Foote, 43305 Burkedale St., South Riding, VA (US) 20152

( * ) Notice: Subject to any disclaimer, the term of this patent is extended or adjusted under 35 U.S.C. 154(b) by 613 days.

(21) Appl. No.: 09/848,305

(22) Filed: May 4, 2001

(65) Prior Publication Data

US 2001/0038342 A1 Nov. 8, 2001

Related U.S. Application Data

(60) Provisional application No. 60/202,062, filed on May 5, 2000.

(51) Int. Cl.[7] .............................................. G08B 23/00
(52) U.S. Cl. ........................... 340/870.02; 340/870.03; 702/62; 705/412
(58) Field of Search ...................... 340/870.02, 870.03; 702/62; 705/412

(56) References Cited

U.S. PATENT DOCUMENTS

| | | | |
|---|---|---|---|
| 3,688,271 A | * | 8/1972 | Rouse ................... 340/870.03 |
| 3,705,385 A | | 12/1972 | Batz |
| 3,900,842 A | | 8/1975 | Calabro et al. |
| 4,119,948 A | | 10/1978 | Ward et al. |
| 4,213,119 A | | 7/1980 | Ward et al. |
| 4,443,786 A | | 4/1984 | Hämmerling et al. |
| 4,523,460 A | * | 6/1985 | Strickler et al. ............... 73/200 |
| 5,056,107 A | | 10/1991 | Johnson et al. |
| 5,194,860 A | | 3/1993 | Jones et al. |
| 5,553,094 A | | 9/1996 | Johnson et al. |
| 5,638,399 A | | 6/1997 | Schuchman et al. |
| 5,684,843 A | | 11/1997 | Furukawa et al. |
| 5,696,501 A | | 12/1997 | Ouellette et al. |
| 5,748,104 A | | 5/1998 | Argyroudis et al. |
| 5,764,158 A | | 6/1998 | Franklin et al. |
| 5,801,643 A | | 9/1998 | Wiiliams et al. |
| 5,892,758 A | | 4/1999 | Argyroudis |
| 5,894,422 A | | 4/1999 | Chasek |
| 5,910,799 A | | 6/1999 | Carpenter et al. |
| 6,006,212 A | | 12/1999 | Schleich et al. |
| 6,069,571 A | | 5/2000 | Tell |
| 6,078,785 A | | 6/2000 | Bush |
| 6,088,659 A | | 7/2000 | Kelley et al. |
| 6,177,883 B1 | | 1/2001 | Jennetti et al. |
| 6,195,018 B1 | | 2/2001 | Ragle et al. |

FOREIGN PATENT DOCUMENTS

DE    23 63 805    12/1973

* cited by examiner

*Primary Examiner*—Albert K. Wong
(74) *Attorney, Agent, or Firm*—Nixon Peabody LLP; Tim L. Brackett, Jr.

(57) ABSTRACT

An airborne meter communication system includes an airborne platform that communicates with ground based utility meters using radio frequencies. The airborne platform retransmits information received from the meters to a network operations center for further processing.

30 Claims, 10 Drawing Sheets

METHOD AND SYSTEM FOR AIRBORNE METER COMMUNICATION

BACKGROUND OF THE INVENTION

1. Field of the Invention

The present invention is directed to the art of meter reading. In particular, the invention is directed to a method and system for collecting meter readings from an airborne platform and transmitting the readings from the airborne platform to a station.

2. Description of Related Art

Utility companies have traditionally employed a manpower-intensive approach to read and record the usage rates of their customer systems. Typically, the utility companies employ a legion of personnel that work selected routes to walk, drive, or ride by residential and commercial customers to read the local meter values and to record the information. This process has been performed by hand scribing the data onto blank forms, using hand-held electronic devices which connect to an interface on the meter, or by using very short-range radio frequency relayed techniques.

The problems faced by these utility companies are numerous. First, the labor force that is required to handle service areas numbering in the thousands and millions of customers requires hundreds of employees. The compensation cost of the labor force is quite high. Second, the infrastructure that is required to transport this labor force to each individual meter is also quite expensive. Each of the individuals requires transportation along their respective route. The cost of this transportation accounts for as much as 40% of the total expenses associated with the meter reading process. Additionally, accidents with the vehicles, replacement costs, insurance and routine maintenance all drive the cost of this transportation higher.

Utility companies also employ a manpower-intensive approach to connect and/or disconnect the utility to the customer. Typically, an individual is dispatched to a location to perform the function in a vehicle owned and operated by the utility. Since the connect/disconnects are generally out of cycle with the meter reading schedule, the workforce that is required to connect and disconnect power is typically separate from the workforce that is used to read the meter, thus adding to the cost of compensation packages, insurance, vehicle operating costs, etc.

There have been a variety of attempts to offset the costs of the manual meter interface system described above. Several attempts to avoid the intensive manpower requirements have included an extensive terrestrial based network. One of these approaches connects the meter through the power lines and relays the meter reading over the power lines to the utility company. This approach requires a complicated infrastructure to be installed. Power lines operate as very large antennas and can receive a large amount of noise. Therefore, to attenuate this noise, signal cleaning filters must be installed periodically along the power lines. These filters are very expensive.

Another approach transmits the meter data to a central site using the phone lines. This approach also requires expensive and intrusive installation features that are undesirable. A similar approach uses an Internet service to communicate the meter reading.

Yet another approach provides a radio frequency transceiver to the meter. The transceiver communicates the meter reading through an extensive infrastructure of land-based local area networked receivers that forward the data along a wide area network. The setup and installation costs for this approach are very high.

Still another approach requires an interface with the customer's television. This very intrusive approach requires modifications to the house wiring.

Yet another approach interfaces the meter with a community cable television system. In addition to the high cost of installation, such a system is not useable in areas without access to a cable system. All of these terrestrial based networks require expensive installation of infrastructure.

Another approach to automated meter reading employs low earth orbiting satellites. However, building, launching and maintaining a fleet of satellites is very expensive.

SUMMARY OF THE INVENTION

An object of the invention is to provide an airborne meter communication system.

Another object of the invention is to provide an airborne meter communication system with a flight planning system that is capable of generating a flight plan that is based upon meter characteristics, such as location, signal strength and the like.

Yet another object of the invention is to provide an airborne meter communication system that can provide substantially real time communication between a ground based station and utility meters via an airborne platform.

An exemplary embodiment of the invention includes an airborne platform, such as an airplane, that is capable of communication with a central station and with a utility meter that includes a radio transceiver. The airborne platform may be a manned or unmanned aircraft. Preferably, the aircraft is capable of all weather operations. The airborne platform includes a radio transceiver with an antenna having a field of view that generally depends upon aircraft altitude and antenna design.

In one exemplary embodiment of the invention, the airborne platform is loaded with unique identifying data for the meters that are to be polled and which are associated with the planned route. Once airborne, the progress of the platform along the planned route is tracked. Preferably, the route is tracked using a flight tracking computer. As the platform arrives at designated waypoints along a flight path, the transceiver is activated to query the meters that have been designated for reading at each corresponding waypoint. In response to the query, the meters transmit data to the airborne platform. The platform then receives the data from each meter and transmits the data to a ground station and may also store the data. The data may include, for example, time of use readings, current value readings, load information, outage reporting, power quality and the like. The data may also include any other information. For example, the airborne platform may provide access to a local loop and/or the Internet. The data may also be related to other non-metering systems such as a home security system and the like.

In another exemplary embodiment of the invention, the airborne platform is capable of transmitting a connect or disconnect command to predetermined utility meters. The utility meters are responsive to receipt of the connect or disconnect command to connect or disconnect service as appropriate. The utility meter may include a disconnect/connect relay to perform this task.

In yet another exemplary embodiment of the invention, the airborne platform includes a flight computer that generates a flight path, with associated waypoints. The location of each waypoint is based upon the location of a predetermined set of ground based meters. Preferably, the flight path (and associated waypoints) is also based upon the orientation of each antenna on the predetermined set of ground-based meters and also anything that may obstruct the signals. Each flight path includes at least one waypoint designated for communicating to the predetermined set of ground based meters.

The invention may include a low altitude aircraft that is flown periodically, a high altitude aircraft that is capable of all weather operation or high altitude, high endurance, high capacity aircraft that may also allow broad band communication. Generally, the higher the altitude of the platform the larger the communication area. Additionally, the faster the aircraft the greater the throughput of data because the meters enter into the field of view faster.

Some exemplary embodiments of the invention may include a ground based station or network operations center. The ground-based station may be in periodic or constant communication with the airborne platform. The airborne platform may then relay data and control signals to and from the ground station to the ground based meters. The ground based station may also plan, control or alter the flight path of the airborne platform. The station may also provide direct conversion of downlinked data to generate bills to the customers. The flight planning station may also be separate from a network operations center.

The electronic meter reading system of the invention ensures extremely high accuracy in correctly associating the meter identification number and the meter location with virtually errorless power consumption data. The invention combines the electronic meter with cost effective mass produced commercial RF transceivers to provide an airborne based architecture to control a large population of meters and to command them to send their information when cued.

The invention may provide a cost efficient, accurate, timely, comprehensive data collection system. The invention may also provide for quick connect/disconnect of service, low cost meter reading, timely out of cycle meter reads, power management analysis tools based upon customer power usage and accurate billing.

BRIEF DESCRIPTION OF THE DRAWINGS

Exemplary embodiments of this invention will be described in detail, with reference to the following figures, wherein.

These and other features and advantages of this invention are described in or are apparent from the following detailed description of exemplary embodiments.

DETAILED DESCRIPTION OF EXEMPLARY EMBODIMENTS

Figure 1:
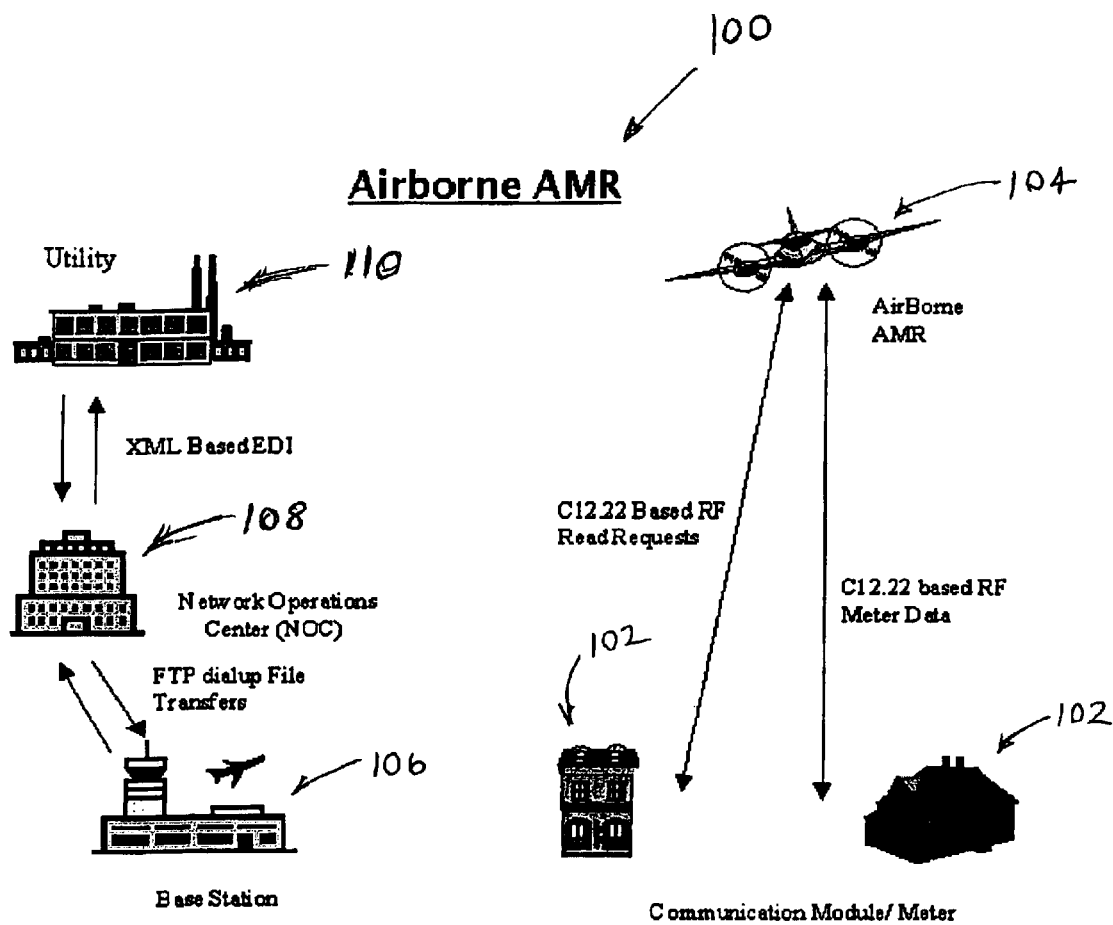
FIG. 1 is a schematic diagram of the operation of a first exemplary embodiment of the invention.

As shown in FIG. 1, the first exemplary embodiment of the airborne meter communication system 100 in accordance with the invention includes a network with three major components. A remote transmitting/receiving unit is located within a utility meter 102 at a customer's site. An airborne transceiver or central transmitting and receiving station (CTS) is located onboard an airborne platform 104. Lastly, a ground station 106 is linked to a network operations center 108. The network operations center 108 is in selective communication with a utility 110.

Ground station 106 receives data from airborne platform 104 via a RF link or via a physical media transfer from the aircraft computer. The information received at ground station 106 is keyed to meter identification numbers that link to customer information. In turn, ground station 106 transfers the data to network operations center 108. A database management system at network operations center 108 stores information from meters 102 and provide the information to billing software along with usage data, cues missed read reports, cues out of cycle read requirements, filters and provides power outage reports, and provides other alerts or data for allied applications. The application separates meter information into segregated account files so that customers can be aligned with the utility company providing the power. The application also filters out power outage or power interrupt information and routes this data to an operator display for immediate action. The application allows assigning connect or disconnect commands to meter identification numbers for outbound routing via the base station communications unit. The database management system permits query based (SQL) data calls permitting customer groupings, searching for specific customers on a geographic basis and similar data field based routines. The database retains electronic power meter information for load analysis. The billing software may be located at network operations center 108 or utility 110.

Figure 4:
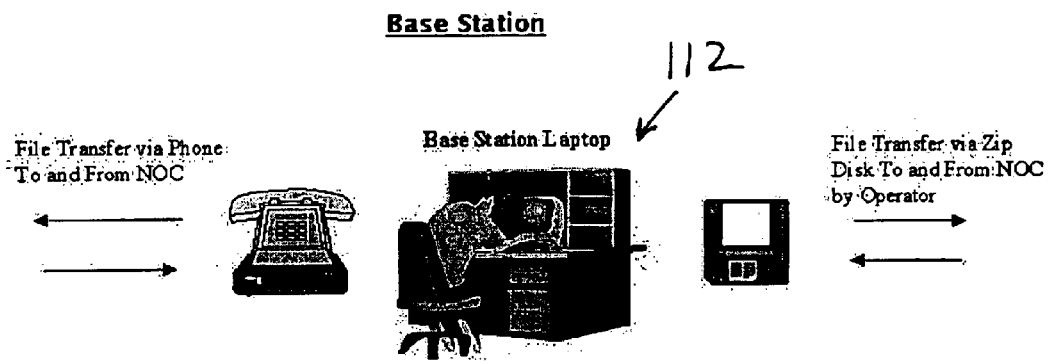
FIG. 4 is a schematic diagram of the ground station of the first exemplary embodiment of the invention.

As shown in FIG. 4, a computer controlled display unit 112 at ground station 106 provides an interface between an operator and all other system components. The operator at ground station 106 can delegate specific meters 102 or groups of meters, for example, based upon geographic grouping for airborne platform 104 to communicate with and download information, can use map based displays to visually show meters with power outages for directing service personnel, can issue commands to connect or disconnect meters, can review and plot power usage from individual meters or from grouped meter families, can display alarms, and can guide or direct airborne platform operations.

Computer controlled display unit 112 has a map based display feature which permits starting with a large area map such as the entire United States and zooming down to city and county maps which show individual power meter locations. Computer controlled display unit 112 of the first exemplary embodiment uses a Windows NT applications program that allows the operator to see where airborne platform 104 is currently located, to cue power meters 102 in the area of platform 104 that need to be downloaded, command power meters 102 that may need to be connected or disconnected, will verify all communication activities between ground station 106 and airborne platform 104 and will support the database management system.

Computer controlled display unit 112 also supports an independent operating mode where the operator establishes a tasking file directing airborne platform operations using a computer diskette. In this mode, the operator prepares the meter read instructions using the application and writes a diskette 114 (FIG. 3) that, when loaded into airborne platform 104, will automatically provide navigation guidance and cue the data exchange activities between airborne platform 104 and meters 102. This same independent operating mode enables airborne platform 104 to write diskette files that are returned to computer controlled display unit 112 with the meter read information.

Figure 5:
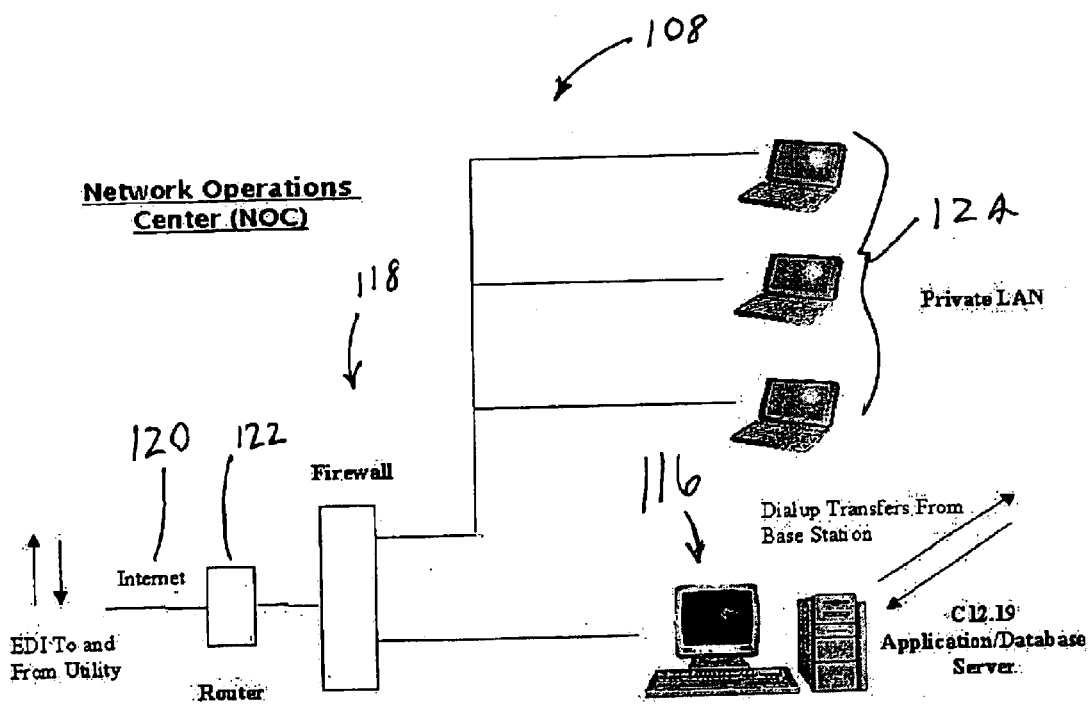
FIG. 5 is a schematic diagram of the network operations center of the first exemplary embodiment of the invention.

As shown in FIG. 5, network operations center 108 of the first exemplary embodiment provides a low cost, yet scaleable solution to data center storage and development needs without sacrificing security and functionality. A dual purpose application/database server 116 sitting behind a PIX firewall 118 stores a C12.19 database. A external SCSI RAID drive (not shown) provides sufficient storage and performance. A high speed connection, such as a partial T1 or DSL solution, provides access 120 to a network, such as the Internet, via a router 122, such as a Cisco 1750 router, so that center 108 can easily interface with utility 110 and the management center 108 can conduct routine daily business operations. A local area network 124 is isolated from application/database server 116 to provide utility 110 with direct access to the database, if desired. A modem (not shown) is also provided on database server 116 to facilitate dial-up connectivity with ground station 106.

The first exemplary embodiment of the invention uses a 2.4 Ghz spread spectrum radio frequency to provide communications between airborne platform 104 and meters 102. This spectrum provides a large throughput capacity and has excellent bandwidth characteristics. Additionally, the use of spread spectrum decreases the likelihood of co-channel interference and increases the accuracy of the communications. It is to be understood, however, that any radio frequency may be used and still form a part of the invention.

The RF design of the first exemplary embodiment 100 allows operations from 255 MHz to 5.7 GHz without changing the data protocol and data rates or the spread spectrum frequency hop RF modulation approach. It is understood that the RF design may be modified to extend the frequency band down to 218/219 MHz for use in some geographic areas. However, presently, this band does not allow either frequency hopping modulation schemes or the bandwidth to support a high data rate. Although, it is understood that future developments of this invention will permit the use of this frequency band.

Figure 6:
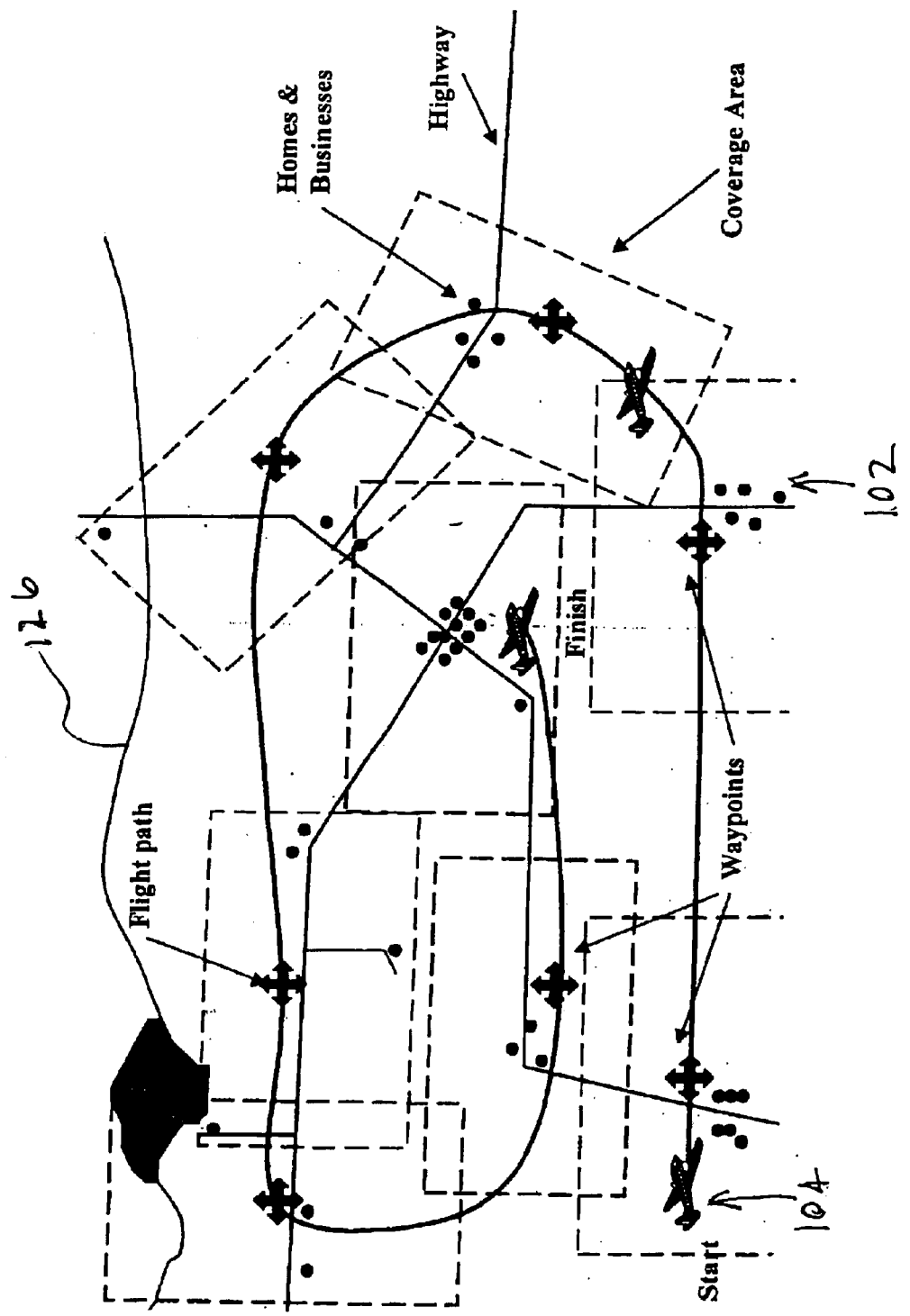
FIG. 6 is a plan view of a flight path determined in accordance with the first exemplary embodiment of the invention.

As shown in FIG. 6, airborne platform 104 of the first exemplary embodiment is flown according to a computer generated flight path 126 through a predetermined set of waypoints and over a corresponding population of meters 102. As airborne platform 104 flies to each waypoint over each corresponding meter 102, platform 104 queries each meter 102, in a manner that is similar to pinging a computer on a network to ensure proper connection, and receives a response from meter 102. Airborne platform 104 subsequently relays the response to ground station 106 which then relays the response to network operations center 108 for processing. The waypoints that determine the flight path 126 are determined based upon a determination of the most efficient flight path 126 that will obtain RF communications between airborne platform 104 and meters 102. Factors to consider in determining an efficient flight path 126 can include the location of the meters 102, the orientation of the RF transceivers on each of the meters 102, airspace restrictions, range capability of the RF communication links, weather, capabilities of the airborne platform, operating frequencies, and the like. In this first exemplary embodiment, flight path 126 is determined by a computer at the ground station 106. It is to be understood, however, that the flight path 126 may also be determined elsewhere, such as by using a computer on the airborne platform 104. The flight path may be determined on the airborne platform 104, at the ground station 106 or at the network operations center 108.

Figure 3:
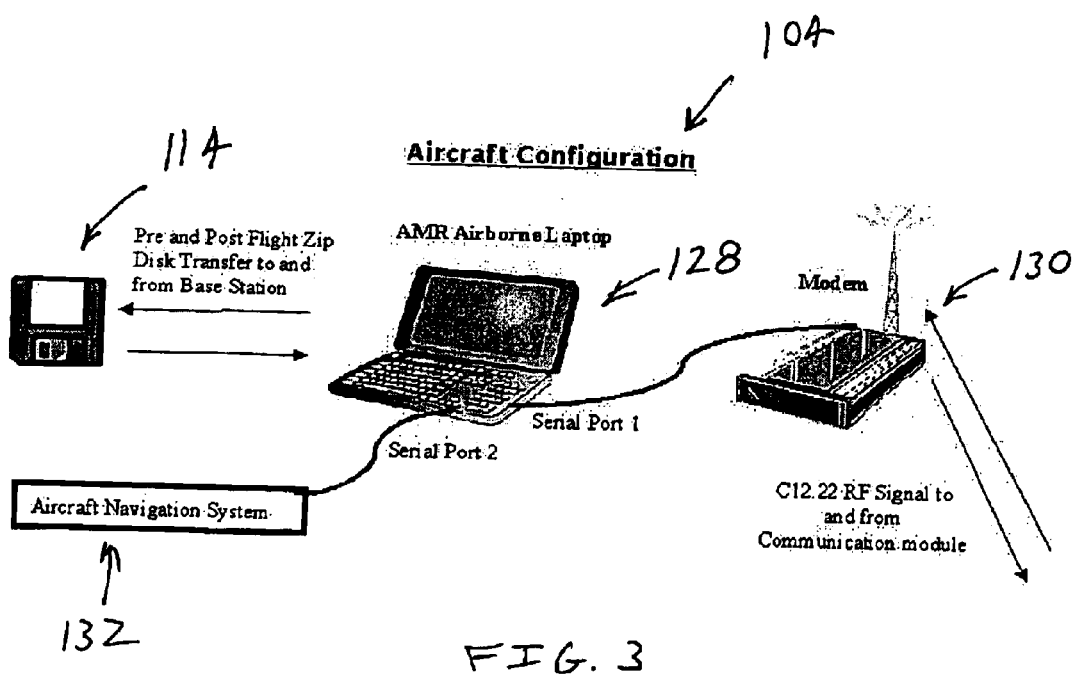
FIG. 3 is a schematic diagram of the airborne platform configuration of the first exemplary embodiment of the invention.

As shown in FIG. 3, airborne platform 104 includes a computer, such as a laptop computer, an aircraft navigation system 132, and a 128 RF transceiver 130 for sending commands to each meter 102 to transmit meter information. RF transceiver 130 also collects the meter information for processing by ground station 106 and/or network operations center 108. The airborne platform 104, preferably, also includes memory (not shown) to, at least temporarily, store the meter information before the meter information is transferred to the ground station 106.

If the computer 128 is a laptop computer, then the computer is portable and may be physically transported between ground station 106 and aircraft 104 to transfer data both before and after a flight. Computer 128 may communicate with a separate computer at ground station 106 using, for example, a RF link. In turn, the ground station 106 relays the data to network operations center 108. Computer 128 may also communicate directly with network operations center 108 using, for example, a dial-up connection. Computer 128 may be permanently mounted in aircraft 104 and files may also be transferred to ground station 106 using any type of media, such as, for example, floppy disks, CD ROMs, ZIP drives and the like. In general, any type of file transfer that communicates the information from the airborne platform 104 to the network operations center 108 may be used with the invention.

Navigation system 132 directs airborne platform 104 along flight path 126. As the airborne platform 104 traverses flight path 126, the computer 128 identifies and locates missed meters 102 alters flight path 126 to guarantee a complete read for each flight.

Figure 2:
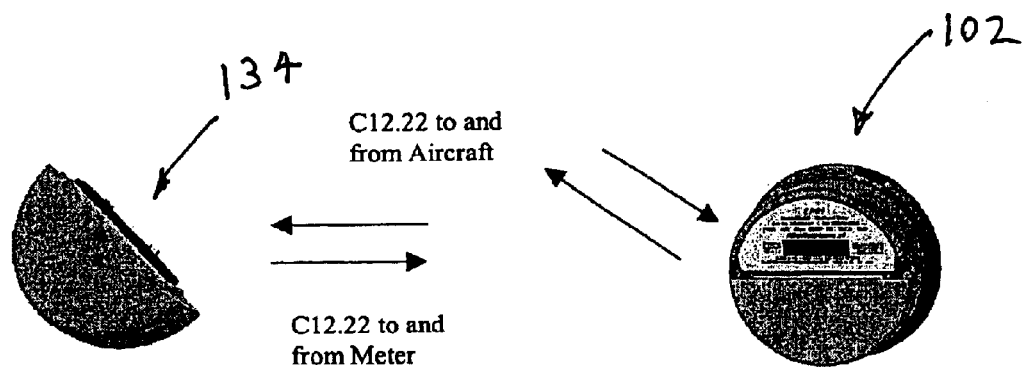
FIG. 2 is a schematic diagram of a ground based utility meter of the first exemplary embodiment of the invention.

In general, because airborne platform 104 is not as constrained with respect to cost, size or weight, platform 104 may be optimized to make up for any performance limitations of RF module 134 at meter 102 (FIG. 2). For example, aircraft operator or computer 128 in airborne platform 104 may control directional antennas (not shown) to increase the range of the RF link between the airborne platform 104 and the meters 102. Additionally, a fairly low technology aircraft has the capability of communicating at long range.

Operations in excess of 50,000 feet may require a more sophisticated platform 104. The higher altitude extends the line-of-sight RF horizon and provides the opportunity to "see" more meters 102, provided the system can deliver greater range of performance. Platform 104 may also use antenna directivity to reduce the number of power meters 102 that are viewed during each repetitive polling operation. Both of these considerations may require more antenna gain on the high altitude platform 104. With increased antenna gain comes the need to have adaptive antenna control to steer the antenna beam to specific spots on the ground as platform 104 traverses flight path 126.

Preferably, computer 128 on airborne platform 104 includes geospatial or geolocation software that allows computer 128 to interface with the aircraft's GPS navigation system 132. Computer 128 will then be able to determine which meters 102 are "visible" to aircraft antenna at any time based upon the location of airborne platform 104 as well as other factors. For example, GPS position data for each meter 102 may be included in a database on computer 128 and this position data may then be used to assist in determining when the airborne platform 104 will be able to communicate with each meter 102. Geospatial software, therefore, is able to determine when to query a meter 102 and to realistically expect a response.

First exemplary embodiment of airborne meter communication system 100 of the invention uses a communications architecture that enables partitioning the meter population to control their responses, interleaving the meter polling and meter responses, deconflicting multiple responses, accounting for all respondents, re-polling for non-acknowledging units and efficient polling and response protocols. Preferably, communication uses open architecture standards to provide marketplace compatibility and competition for meter reading.

The communications architecture for the invention may include a point to multi-point approach with each RF module 134 having a unique network identification number which is individually accessed through an AT script file command and a call book structure. The data content preserves an ANSI C12.22 data protocol which is used by the first exemplary embodiment of the invention.

RF module 134 may also be connected to a home area network (not shown) that is in communication with other devices. For example, home area network may be connected to other meters, such as gas and water meters, and may also be connected to a home security system, home appliances and devices, and a home computer. Meter transceiver provides another path for data communication and may be utilized for any purpose in addition to meter related data communication.

Meter 102 of the first exemplary embodiment includes a modified SE-240 Digital Electronic Power Meter. The SE-240 was developed by the Electric Power Research Institute and was designed to communicate data electronically. Communications with the meter are based upon ANSI standards to ensure meter compatibility. Communications with this meter can be via an optical connection which is intended to make manual reading faster and more accurate or via an electronic communications interface which is intended for external plug in devices. This meter can provide additional information about power usage profiles beyond the total power consumed. Thus, providing the opportunity to download stored hourly or daily usage patterns, provide for connect and disconnect functions, provide service interrupt alerts that are due to tampering, provide power outage notification and potentially communicate with other devices, such as gas or water meters, and store the information in the meter. It is understood, however, that any meter capable of communicating data to a RF module may form a portion of the invention.

In the first exemplary embodiment of airborne meter communication system 100 the SE-240 is modified to use an ANSI C12.22 communication protocol, the plastic case is reoriented to optimize the antenna location, the calibration algorithm is updated to improve accuracy, the case is changed from a clear plastic to a gray polycarbonate to reduce cost and chip sockets are eliminated to reduce costs.

The ANSI C12.22 protocol is a newer, more flexible communications architecture than C12.18. The two are quite similar and compatible but the new protocol permits faster data transfer. Additionally, the C12.22 protocol is a network communications protocol while the C12.18 protocol is a data communications protocol. The C12.22 protocol is based on a network communications standard, which provides greater ability to address the meter and download data in comparison to the C12.18 data communications protocol. The C12.22 protocol includes a peer-to-peer interface that allows for concurrent wake-ups that also increases the throughput. The C12.22 protocol also provides encryption for security purposes, as well as, a smaller packet size which can later be mapped in the central database to obtain more detailed information about the meter dependent on manufacturer.

The meter 102 of the first exemplary embodiment includes an RF module 134 that plugs into the SE-240 meter and communicates with the SE-240 meter via a connector (not shown). The SE-240 meter supplies power to RF module 134, receives commands to download data from module 134, and supplies information to module 134. RF module 134 uses a wireless digital RF transceiver to communicate with airborne platform 104. Preferably, the transceiver has between 100 milliwatts and 1 watt (20 to 30 dBm) of transmit power, at least −90 dBM receiver sensitivity, has a transceiver data protocol that supports efficient polling architectures, will reject interfering signals and is small enough to fit into the plug in module 134. With the 20 to 30 dBm transmit power at RF module and −10 dBm sensitivity at the airborne platform 104, the link margins permit communications at up to 16 miles even with additional losses or signal attenuation which may be associated with building or foliage.

As explained above, the SE-240 meter is modified in the first exemplary embodiment by rotating it 180 degrees so that the RF module 134 resides on the upper half of meter 102 when it is connected to the SE-240 meter. This allows the antenna in RF module 134 to be optimally positioned relative to the SE-240 to communicate with airborne platform 104.

RF module 134 provides the basis to both easily command data downloads from the meter 102 to the airborne platform 104, to receive the information in the airborne platform 104 and to forward the meter data directly to the utility company or to a second party meter reading contractor.

RF module 134 includes a microprocessor that controls the module operations. The microprocessor controls the transfer of data between RF module 134 and the SE-240 meter. The microprocessor also controls communications between the RF module 134 and airborne platform 104. The processing power required for the microprocessor depends at least partially upon the RF transceiver design. RF module 134 is programmed to contain a unique address that serves as a key in identifying the meter 102 and later the customer. A C12.22 representation of a C12.19 data table in the SE-240 meter are received in the communications module 134 and transmitted via RF to airborne platform 104.

Figure 7A:
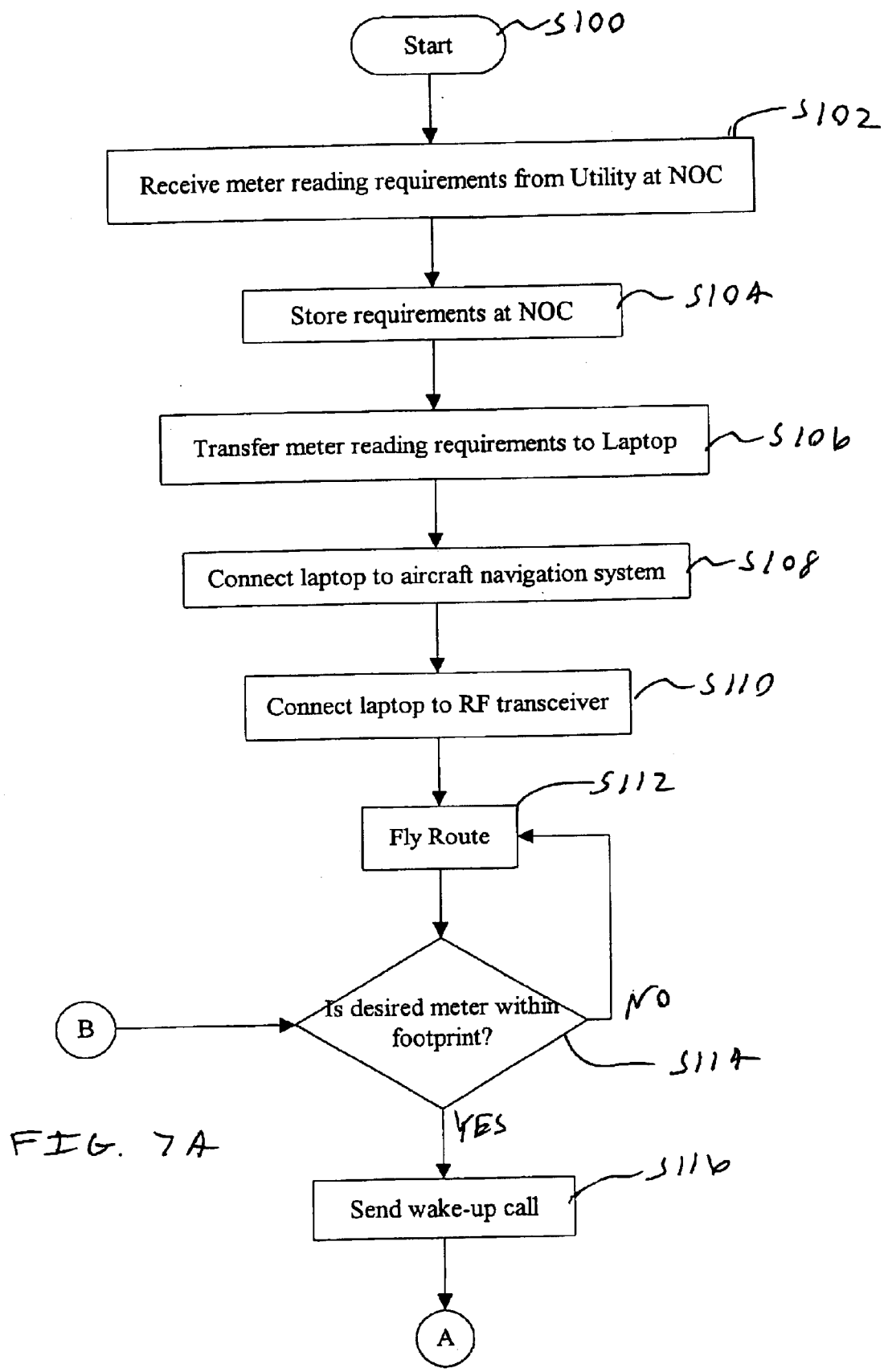
FIGS. 7A and 7B is a flowchart detailing the operation of the first exemplary embodiment of the invention.
Figure 7B:
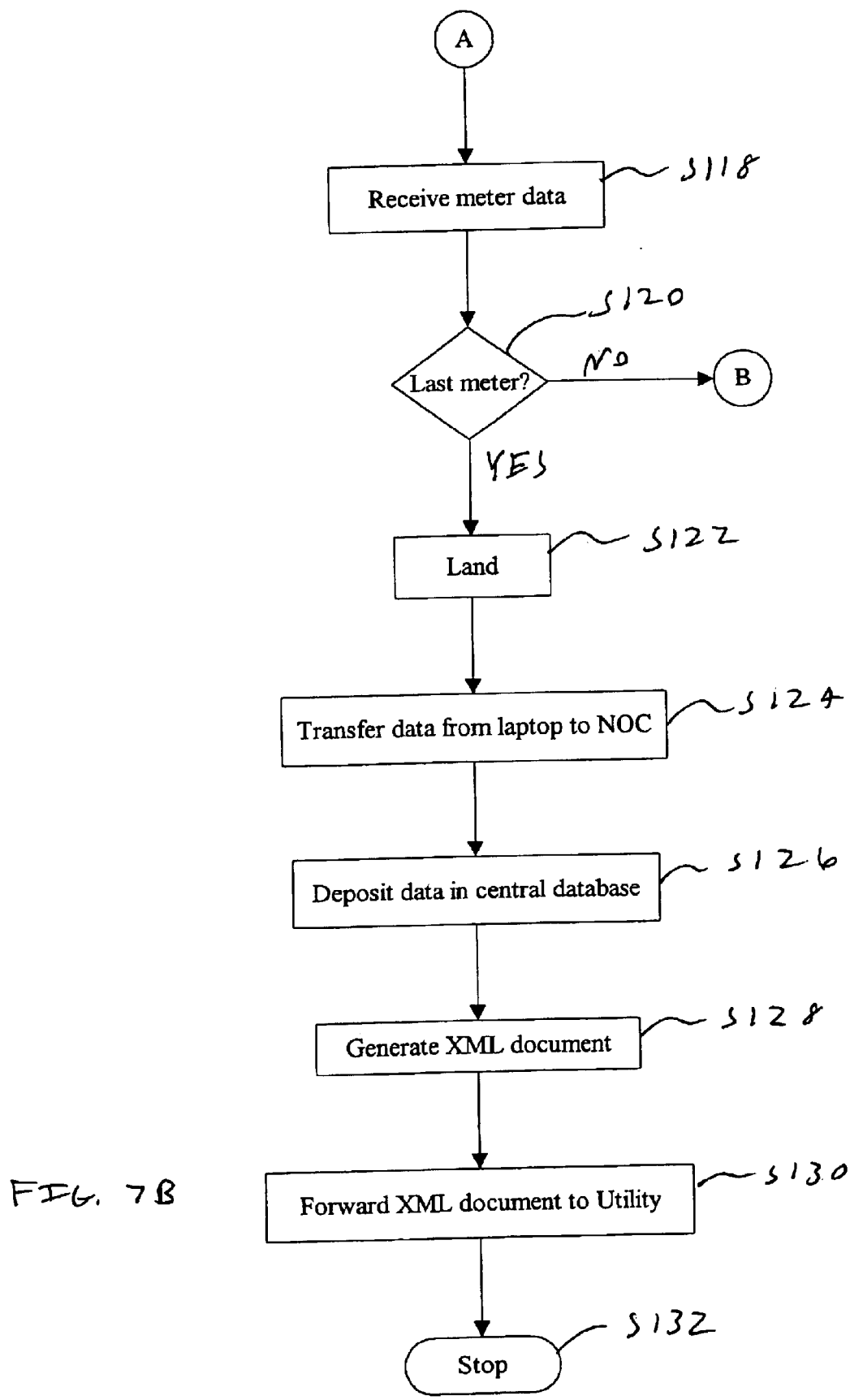

The flowchart of FIGS. 7A and 7B shows one method of operating the first exemplary embodiment of airborne meter communications system 100 of the invention. The flowchart starts at step S100 and continues to step S102. In step S102, network operations center 108 receives meter reading requirements from utility 110 and the routine continues to step S104. In step S104, the requirements are stored locally at network operations center 108 and the routine continues to step S106. In step S106, the meter reading requirements are transferred to computer 128 for airborne platform 104 via ground station 106. In step S108, computer 128 is connected to aircraft navigation system 132 and in step S110, computer 128 is connected to RF transceiver 130 and the routine continues to step S112. In step S112, airborne platform 100 initiates and flies a route that corresponds with a flight path 126. In step SI 14, computer 128 determines whether a meter 102 is within the RF range of airborne platform 104. If, in step S114, computer 128 determines that a meter 102 is not within RF range of airborne platform 104, then the routine returns to step S112. If, however, in step S114, computer 128 determines that a meter 102 is within RF range of airborne platform 104, then the routine continues to step S116.

In step S116, computer 128 commands RF transceiver 130 to send a wake-up call to meter 102 and the routine continues to step S118 (FIG. 7B). In step S118, airborne platform 104 receives data from meter 102 and the routine continues to step S120. In step S120, computer 128 determines whether the last meter 102 has been read. If, in step S 120, computer 128 determines that the last meter 102 has not been read, then the routine returns to step S114. If, however, in step S120, computer 128 determines that the last meter 102 has been read, then the routine continues to step S122. In step S122, computer 128 indicates to navigation system 132 and to the operator of the airborne platform 104 that the last meter has been read and airborne platform 104 lands and the routine continues to step S124. In step S124, the meter data is transferred from computer 128 to network operations center 108 via ground station 106 and the routine continues to step S126. Alternatively, in steps not shown in this flowchart, the airborne platform may transmit the meter data to the ground station 106 before landing. In step S126, the meter data is stored on database server 116 at network operations center 108 and the routine continues to step S128. In step S128, network operations center 108 generates an XML document based upon the meter data and the routine continues to step S130. In step S130, network operations center 108 transfers the XML document to utility 110 and the routines continues to step S132. In step S132, the operation is complete and the routine stops.

Figure 8:
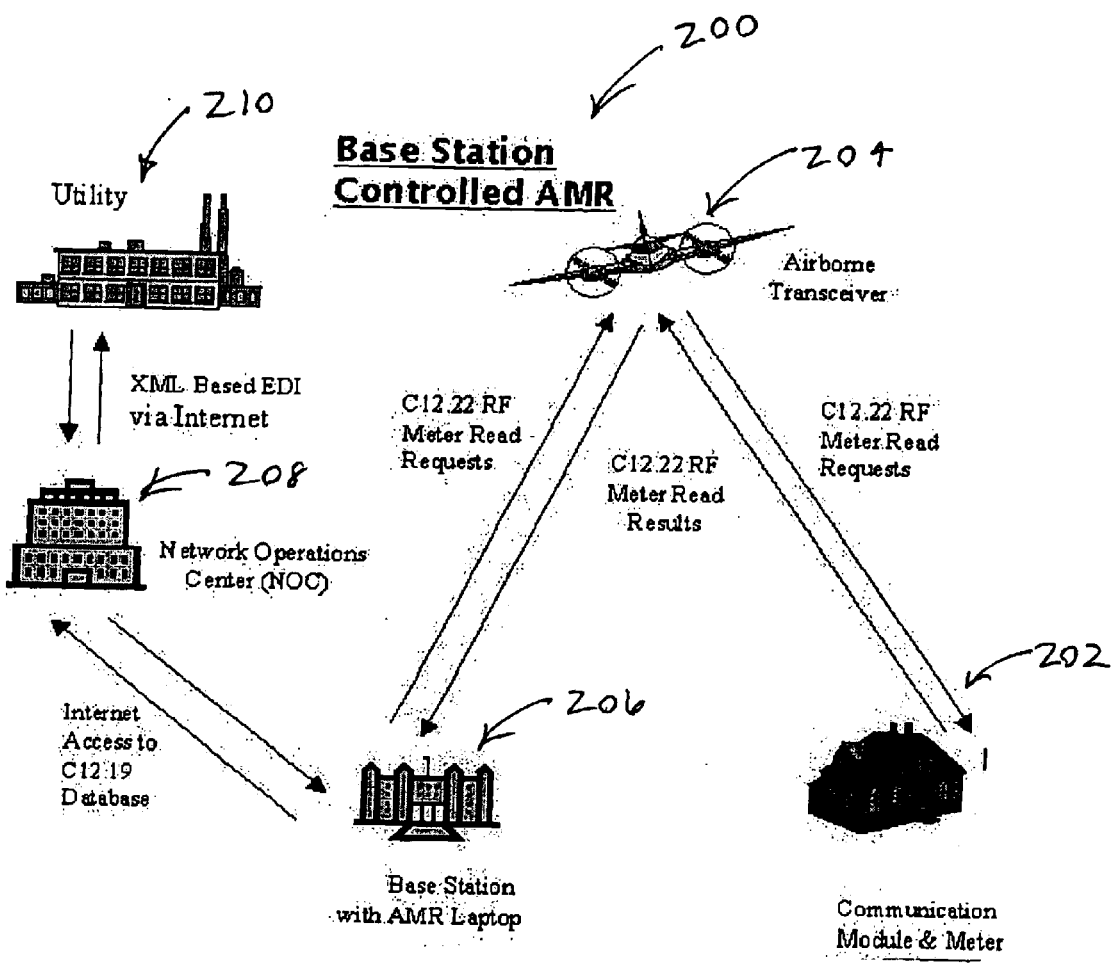
FIG. 8 is a schematic diagram of the operation of a second exemplary embodiment of the invention.

FIG. 8 shows a schematic of a second exemplary embodiment of an airborne meter communication system 200 of the invention where ground station 206 controls the operations of airborne platform 204. Ground station 206 has near-real-time connectivity with ground based meters 202 via airborne platform 204.

Airborne platform 204 can use the same RF transceiver to relay the data to ground station 206 and receive commands from the computer to relay to the RF module. This "bent-pipe" approach allows frequent collection of data, near-real-time connects/disconnects and remote monitoring of the network.

For a high altitude airborne platform 204, the RF communications transceiver link to meters 202 may be separate from the RF communications transceiver link to ground station 206. This separation allows optimization of each link for the high altitude profile. The optimization can include using antenna gain to boost signal strength, using antenna steering to place the antenna beam on the right spot on the ground to read data from specific large meter areas, and using separate RF operation channels (when using discrete frequencies) to speed up the operation.

Figure 9:
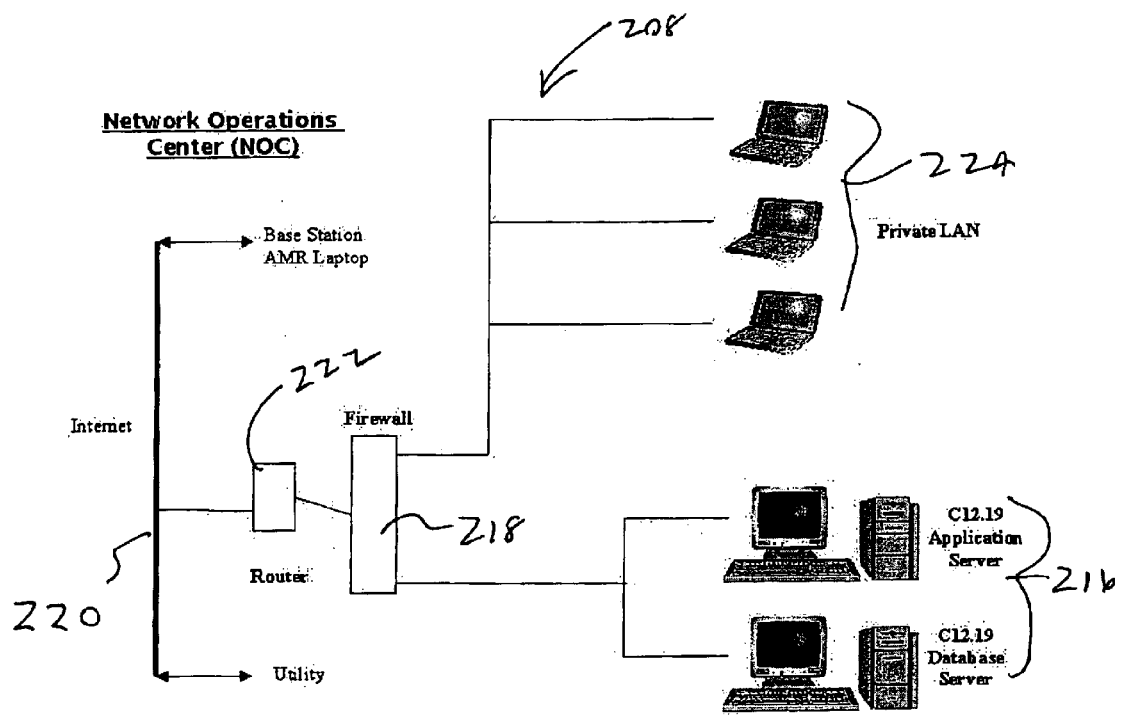
FIG. 9 is a schematic diagram of the network operations center of the second exemplary embodiment of the invention.

FIG. 9 shows a schematic diagram of network operations center 208 of the second exemplary embodiment of airborne meter communication system 200. Network operations center 208 is similar to network operations center 108 of the first exemplary embodiment, except application/database server 216 includes an application server that is segregated from a database server. The database server contains utility company data on customers and the application server runs the operational functions of the system. Additionally, Internet connection 220 provides communication to ground station 206 as well as utility 210.

Figure 10:
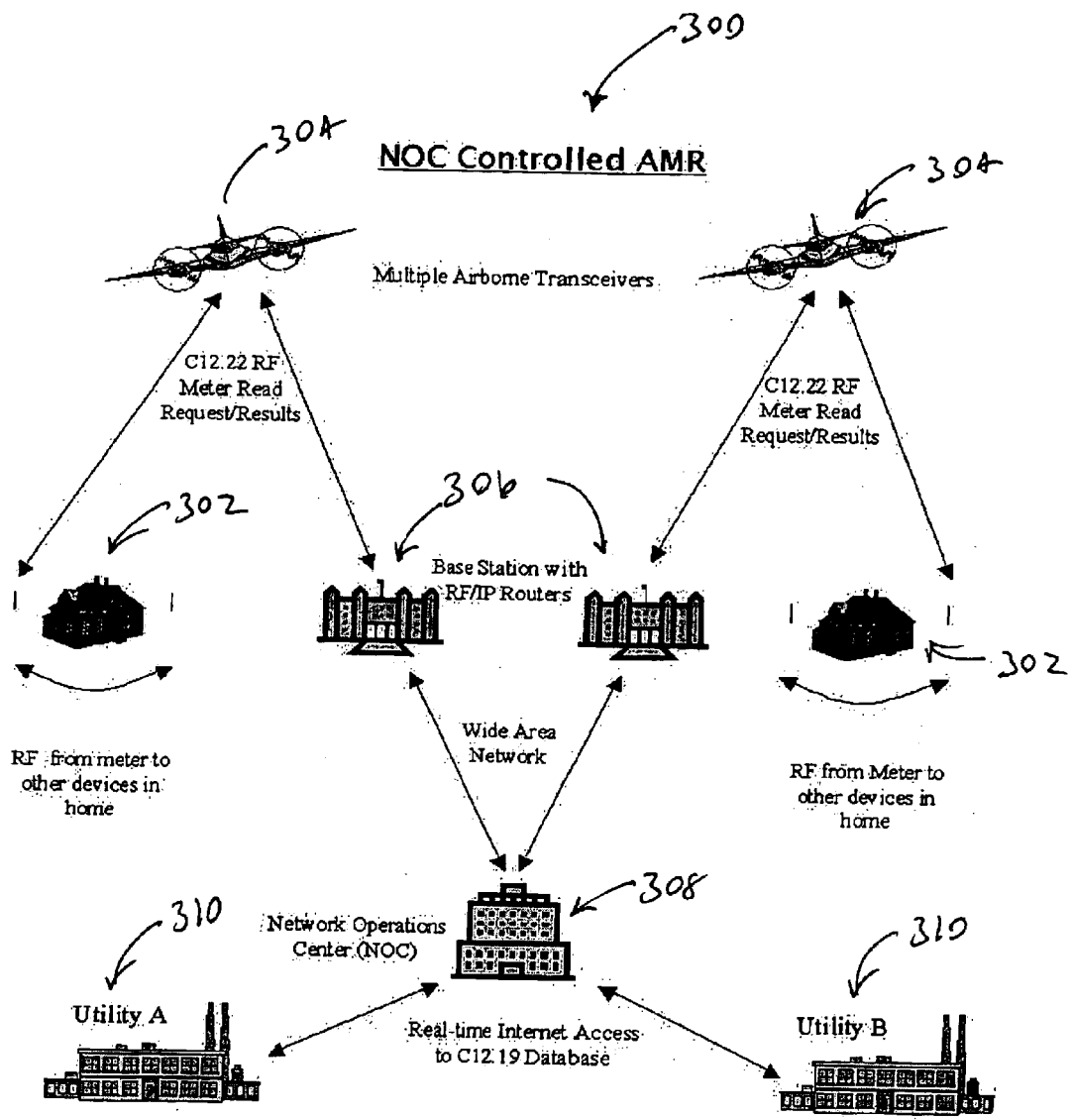
FIG. 10 is a schematic diagram of the operation of a third exemplary embodiment of the invention.

FIG. 10 shows a schematic diagram of a third exemplary embodiment of an airborne meter communications system 300 in accordance with the invention. In the third exemplary embodiment. Network operation center 308 controls the entire meter communication system 300. Network operation center 308 issues commands to a meter 302 and receives data from meter 302 via an airborne platform 304 and ground station 306. As shown in FIG. 10, network operations center 308 may be in communication and may control multiple ground stations 306, airborne platforms 304 and meters 302, simultaneously and substantially in real-time. Additionally, network operations center 308 may be in communication with multiple utilities 310. Network operations center 308 may also perform the functions of the ground station 306 and communicate with the airborne platforms 304 directly.

Figure 11:
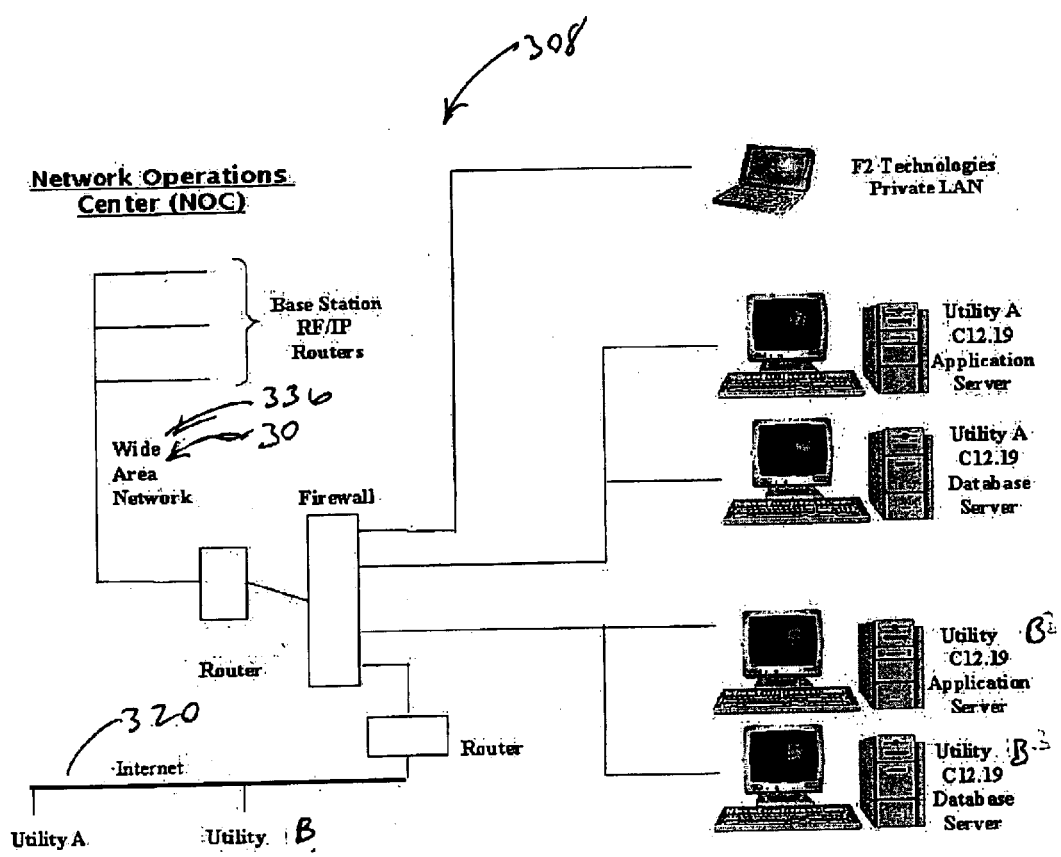
FIG. 11 is a schematic diagram of the network operations center of the third exemplary embodiment of the invention.

FIG. 11 shows a schematic diagram of network operations center 308 of the third exemplary embodiment. Network operations center 308 is similar to network operations center 208 of the second exemplary embodiment, except network operations center 308 maintains a separate dedicated application/database server 316 for each of a plurality of utilities 310. Additionally, Internet connection 320 provides communications with the plurality of utilities 310 and a wide area network 336 provides communication with a plurality of ground stations 306. Operators control all data exchange communications from network operations center 308 or ground station 306 including all airborne flight operations. Flight routes are, preferably, predetermined with flight routes at 50,000 feet or greater.

While this invention has been described in conjunction with the specific embodiments outlined above, it is evident that many alternatives, modifications and variations are apparent to those skilled in the art. Accordingly, the exemplary embodiments of the invention as set forth above are intended to be illustrative and not limiting. Various changes may be made without departing from the spirit and scope of the invention.

What is claimed is:

1. An airborne meter communication system comprising:
    an airborne platform movable through a flight path and including a first radio frequency transceiver adapted to transmit a meter interrogation signal at a predetermined waypoint along the flight path; and
    a ground based utility meter including a second radio frequency transceiver adapted to transmit meter data in response to receipt of the meter interrogation signal, wherein the airborne platform is adapted to receive the data and to transmit the meter data to a ground based station adapted to receive the data from the airborne platform and transmit data to the airborne platform, wherein the data transmitted to the airborne platform includes one of a connect command, a disconnect command and a flight path.

2. The system of claim 1, wherein the data related to the meter includes data regarding one of usage patterns, total power consumed, service interrupt alerts, and power outage data.

3. The system of claim 1, wherein the data includes one of usage data and meter identification data.

4. The system of claim 1, wherein the first radio frequency transceiver includes a directional antenna.

5. The system of claim 1, wherein the first radio frequency transceiver includes adaptive antenna control.

6. The system of claim 1, wherein the airborne platform further includes a computer in communication with the first radio frequency transceiver.

7. The system of claim 6, wherein the airborne platform further includes a navigation system in communication with the computer and wherein the computer is adapted to control the first radio frequency transceiver based upon data received from the navigation system and upon the location of the ground based utility meter.

8. The system of claim 7, wherein the computer controls the first radio frequency transceiver based further upon an antenna orientation on the second radio frequency transceiver and upon any obstruction to communication between the first radio frequency transceiver and the second radio frequency transceiver.

9. The system of claim 1, wherein the airborne platform further comprises data storage for storing the data related to the meter.

10. The system of claim 1, further comprising a computer controlled display.

11. The system of claim 1, wherein the ground based station is adapted to transmit data to the airborne platform by one of a RF transmission and a physical media.

12. The system of claim 1, wherein the ground based station is adapted to receive the data via radio frequency communication from the airborne platform.

13. The system of claim 1, further comprising a network operations center adapted to selectively communicate with the ground based station.

14. The system of claim 13, wherein the network operations center is further adapted to selectively communicate with a utility company.

15. An airborne meter communication system comprising:
an airborne platform movable through a flight path and including a first radio frequency transceiver adapted to transmit a meter interrogation signal at a predetermined waypoint along the flight path;
a ground based utility meter including a second radio frequency transceiver adapted to transmit meter data in response to receipt of the meter interrogation signal, wherein the airborne platform is adapted to receive the data and to transmit the meter data;
a ground based station adapted to receive the meter data from the airborne platform; and
a network operations center adapted to selectively communicate with the ground based station.

16. The system of claim 13, wherein the network operations center comprises:
a local area network;
an application/database server in communication with the local area network;
a firewall in communication with the local area network; and
a router in communication with the firewall.

17. The system of claim 16, wherein the network operations center further comprises a modem for selective communication with the ground based station.

18. The system of claim 15, wherein the application/database server comprises:
an application processor; and
a database in communication with the application processor.

19. The system of claim 18, wherein the database includes meter related information and wherein the application processor is adapted to separate the meter related information into segregated files in the database.

20. The system of claim 19, wherein the application processor is adapted to segregate the information based upon the meter identification.

21. The system of claim 19, wherein the application processor is adapted to permit query based data calls to the database.

22. The system of claim 16, wherein the application/database server comprises:
an application server in communication with the local area network; and
a database server in communication with the local area network.

23. The system of claim 22, wherein the database server comprises a database that includes information regarding one of usage data, missed read reports, out of cycle read requirements, power outage reports and alerts.

24. The system of claim 22, wherein the network operations center is further adapted to selectively communicate with a plurality of utilities and wherein the network operations center includes an application/database server for each of the plurality of utilities.

25. The system of claim 16, wherein the network operations center further comprises an operator display and wherein the application/database sewer is adapted to route meter data regarding one of power outage and power interrupt information to the operator display.

26. The system of claim 1, wherein the ground based utility meter is in communication with one of another meter, a home security system, a home appliance, a home network, and a home computer.

27. A method for airborne meter communication, comprising the steps of:
receiving data, from a navigation system, into an airborne platform:
transmitting a meter interrogation signal from the airborne platform, wherein the airborne platform includes a computer adapted to transmit the meter interrogation signal based upon data received from the navigation system and upon the location of a ground utility based meter;
receiving the meter interrogation signal from the airborne platform in the ground based utility meter;
transmitting data from the ground based utility meter in response to receiving the meter interrogation signal;
receiving the data from the ground based utility meter in the airborne platform; and
transmitting the data from the airborne platform.

28. The method of claim 27, further comprising the step of receiving the data from the airborne platform in a ground based station.

29. A method for airborne meter communication, comprising the steps of:
transmitting one of a meter connect command and a disconnect command from an airborne platform;

receiving one of a meter connect command and a disconnect command from the airborne platform in a ground based utility meter; and one of connecting service in response to the connect command and disconnecting service in response to the disconnect command.

30. An airborne meter communication system comprising:

an airborne platform movable through a flight path and including a first radio frequency transceiver adapted to transmit a meter interrogation signal at a predetermined waypoint along the flight path; and a ground based utility meter including a second radio frequency transceiver adapted to transmit meter data in response to receipt of the meter interrogation signal, wherein the airborne platform is adapted to receive the data and to transmit the meter data to a ground station;

wherein the airborne platform further includes a computer in communication with the first radio frequency transceiver; and a navigation system in communication with the computer and wherein the computer is adapted to control the first radio frequency transceiver based upon data received from the navigation system and upon the location of the ground based utility meter.

* * * * *